United States Patent
Takahashi

(10) Patent No.: US 7,747,127 B2
(45) Date of Patent: Jun. 29, 2010

(54) OPTICAL MEMBER AND METHOD OF PRODUCING THE SAME

(75) Inventor: Takashi Takahashi, Tokyo (JP)

(73) Assignee: Kabushiki Kaisha Topcon, Tokyo (JP)

( * ) Notice: Subject to any disclaimer, the term of this patent is extended or adjusted under 35 U.S.C. 154(b) by 608 days.

(21) Appl. No.: 11/347,362

(22) Filed: Feb. 6, 2006

(65) Prior Publication Data

US 2006/0126189 A1   Jun. 15, 2006

Related U.S. Application Data

(62) Division of application No. 10/758,085, filed on Jan. 16, 2004, now abandoned.

(30) Foreign Application Priority Data

Feb. 28, 2003  (JP)  .............. 2003-053450
Mar. 11, 2003  (JP)  .............. 2003-064508
Jun. 10, 2003  (JP)  .............. 2003-165530

(51) Int. Cl.
*G02B 6/00*  (2006.01)
*G02B 26/00*  (2006.01)
*G02B 13/14*  (2006.01)

(52) U.S. Cl. .......... 385/141; 385/31; 385/33; 385/39; 385/142; 359/227; 359/228; 359/237; 359/290; 359/291; 359/350; 359/355; 359/358; 359/642; 359/665

(58) Field of Classification Search ............ 359/227, 359/228, 237, 290, 291, 350, 355, 358, 642, 359/665; 385/31, 33, 39, 141, 142
See application file for complete search history.

(56) References Cited

U.S. PATENT DOCUMENTS

| 4,364,786 | A |   | 12/1982 | Smith, Jr. et al. |
| 4,781,445 | A |   | 11/1988 | Baba et al. |
| 5,589,239 | A |   | 12/1996 | Tomono et al. |
| 5,597,670 | A |   | 1/1997 | Aketagawa et al. |
| 5,627,674 | A | * | 5/1997 | Robb ................ 359/355 |
| 5,665,275 | A | * | 9/1997 | Kobayashi et al. ....... 252/582 |
| 5,867,736 | A |   | 2/1999 | Jantz |
| 6,239,823 | B1 | * | 5/2001 | Fotland ............ 347/127 |
| 2002/0034642 | A1 | * | 3/2002 | Takahashi et al. ......... 428/426 |
| 2002/0035024 | A1 |   | 3/2002 | Kato |

FOREIGN PATENT DOCUMENTS

| JP | 60-176017 A | 9/1985 |
| JP | 60-186444 A | 9/1985 |

(Continued)

OTHER PUBLICATIONS

T. Takahashi, U.S. PTO Office Action, U.S. Appl. No. 10/758,085, Mar. 23, 2006, 9 pgs.
T. Takahashi, U.S. PTO Office Action, U.S. Appl. No. 10/758,085, Jul. 14, 2008, 8 pgs.

(Continued)

*Primary Examiner*—Ryan Lepisto
(74) *Attorney, Agent, or Firm*—Foley & Lardner LLP

(57) ABSTRACT

A plurality of optical members (lenses) for use in ultraviolet region are mutually stuck. A fluorine-based organic compound (for example, fluorine-based oil) is provided between them. The periphery of the optical members is sealed with a sealant. As the sealant, an adhesive fluorine resin, for example, a soluble fluorine resin is used.

3 Claims, 1 Drawing Sheet

FOREIGN PATENT DOCUMENTS

| | | |
|---|---|---|
| JP | 02-287419 A | 11/1990 |
| JP | 05-002105 A | 1/1993 |
| JP | 06-118202 A | 4/1994 |
| JP | 2003-012349 A | 1/2003 |
| WO | WO 94/14415 * | 7/1994 |

OTHER PUBLICATIONS

T. Takahashi, U.S. PTO Office Action, U.S. Appl. No. 10/758,085, Oct. 10, 2006, 8 pgs.

T. Takahashi, U.S. PTO Office Action, U.S. Appl. No. 10/758,085, Oct. 29, 2007, 11 pgs.

* cited by examiner

OPTICAL MEMBER AND METHOD OF PRODUCING THE SAME

The present application is a divisional of U.S. application Ser. No. 10/758,085, filed Jan. 16, 2004, the entire contents of which are incorporated herein by reference.

BACKGROUND OF THE INVENTION

1. Field of the Invention

The present invention relates to an optical member for use in ultraviolet region (for example, an optical member for use in a transmitting optical system such as laminated lens or prism) and a method of producing the same and, particularly, to an optical member suitable for use in the ultraviolet region of a semiconductor inspection device or the like and a method of producing the same.

2. Description of the Related Art

In conventional semiconductor inspection devices and other accurate measuring devices, inspection of a wafer or the like has been performed in an ultraviolet wavelength area of 200-400 nm, and a quartz ($SiO_2$)-made lens or a fluorite ($CaF_2$)-made lens is used in such semiconductor inspection devices for correction of chromatic aberration (achromatization).

For example, as shown in Japanese Patent Application Laid-Open No. 60-186444, it is known to protect the boundary part of the adhesive surface of a prism type optically adhered beam splitter for interferometer with the outside with a sealant.

An optical element having an adhesive member constituted as a film having both a film thermal adhesive layer and a barrier layer by using a thermally fusible film with high steam barrier property such as fluorine-based film is known as shown in Japanese Patent Application Laid-Open No. 2-287419, wherein CTFE (polychlorotrifluoroethane), FEP (polyperfluoroethylene-propylene), PVDF (polyvinylidene fluoride), PVDC (polyvinylidene chloride) and the like are used as the material of the film.

Further, as shown in Japanese Patent Application Laid-Open No. 60-176017, an optical element in which a rubber elastic body such as ethylene propylene rubber or silicone rubber which is transparent under visible light is put between two lenses which are not closely fitted, and the rubber elastic body is covered with a piezoelectric film such as polyvinylidene fluoride or the like is known.

In Japanese Patent Application Laid-Open No. 5-2105, as the material of an annular film constituting the film material, for example, thermoplastic resins and thermosetting resins such as polyethylene, polypropylene, polyvinyl chloride, polyamide, polystyrene, polyisobutylene, polycarbonate, polyvinilydene chloride, polyvinyl acetal, polymethyl methacrylate, polyacrylonitrile, polyimide, cellulose-based fluorine resin, epoxy, polyurethane, silicone resin; copolymers thereof; and those with plasticizer or filler added thereto are used.

As shown in Japanese Patent Laid-Open No. 2003-12349, a joined optical element for UV region is also known, which is formed through an adhesive layer by joining optical elements capable of transmitting ultraviolet rays, using as the adhesive layer a solution in which a solvent-soluble organic fluorine resin having no unsaturated bond in the molecule is dissolved in a fluorine-containing solvent having a boiling point of 150° C. or higher and containing no unsaturated bond in the molecule, vaporizing the solvent in the part in contact with atmosphere of the adhesive layer, and joining the optical elements in the state where the solvent in the other part is left in the adhesive layer.

The adhesion by use of a conventional sealant had problems as that the inside solvent is not hardened because it is not vaporized due to large adhesion distortion, a heating treatment cannot be performed because it affects a high precision lens, and an axial slippage is caused. Therefore, an extremely precise device such as semiconductor inspection device could not be suitably used in ultraviolet region.

SUMMARY OF THE INVENTION

In consideration of the above problems, the present invention thus has an object to provide an optical member sealed with a sealant never deteriorated by UV absorption and capable of precisely mutually bonding optical elements or the like and a method of producing the same.

Preferred modes of the present invention are then described.

A plurality of optical members for use in ultraviolet region are closely fitted and stuck together. A fluorine-based organic compound is filled between the optical members. The periphery of the fluorine-based organic compound is sealed with an adhesive fluorine resin, e.g., a soluble fluorine resin in the periphery of the optical members.

A preferred sealant is a sealant which is never deteriorated by ultraviolet absorption, causes no adhesion distortion when covering the optical elements, so that the inside solvent can be easily vaporized and hardened without requiring a heating treatment, nor axial slippage. As the most suitable material to be filled in the optical elements for use in ultraviolet region, a fluorine-based organic compound is adapted. A preferred example of the fluorine-based organic compound is a fluorine-based oil (fluorine grease).

DESCRIPTION OF THE PREFERRED EMBODIMENTS

The present invention will be further described in reference to the drawings.

Figure 1:
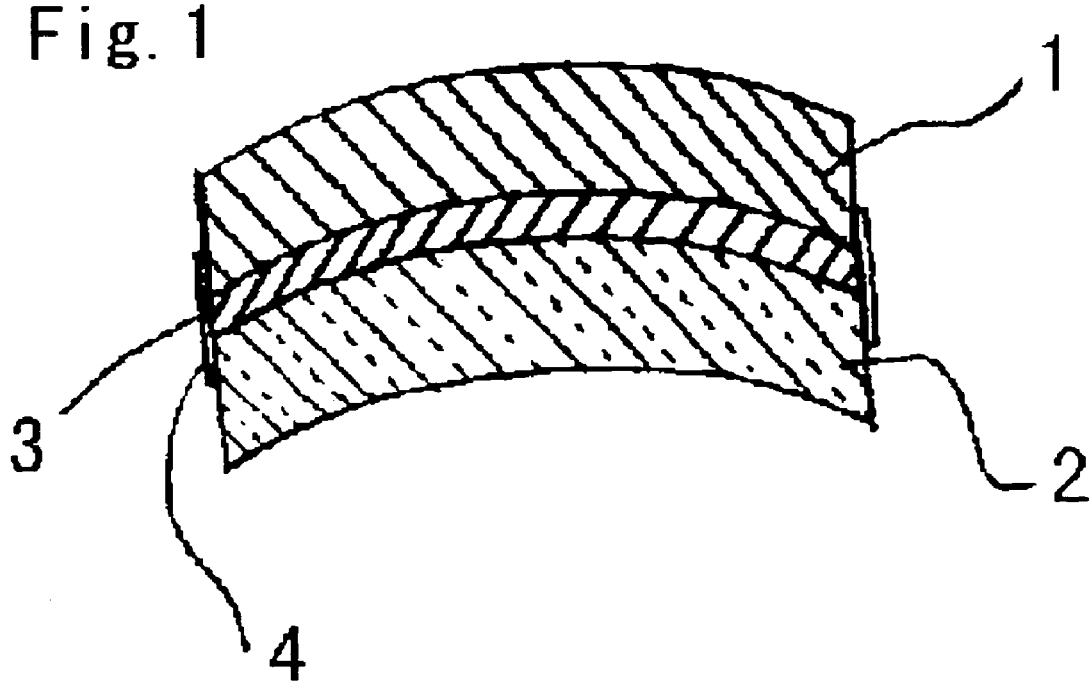
FIG. 1 is a schematic sectional view of an optical member according to one embodiment of the present invention.

FIG. 1 shows an optical member according to one embodiment of the present invention.

In FIG. 1, the optical member comprises two lenses 1 and 2 for use in ultraviolet region.

The lens 1 is a lens formed of a fluorite ($CaF_2$) about 20 mm in diameter, and the lens 2 is a lens formed of a synthetic quartz ($SiO_2$) about 20 mm in diameter. A gap entirely having the same thickness is preferably provided between the lenses 1 and 2. A fluorine grease 3 that is one preferred example of the fluorine-based organic compound is perfectly filled in the gap. Consequently, the lenses 1 and 2 are mutually closely fitted and stuck.

The dimension of the gap between the lenses in FIG. 1 is set to 10-20 μm.

The profile irregularities of the fluorite ($CaF_2$) lens 1 and the synthetic quartz ($SiO_2$) lens 2 are, for example, about $1/20\lambda$, wherein λ shows a standard wavelength, and it is set, as described later, to a wavelength of transmitted ultraviolet rays 200-300 nm, for example, 248 nm.

A wavelength of 100-200 nm, for example, 193 nm is also possible depending on the power of laser.

The fluorine grease 3 has durability to an excimer laser such as KrF laser described later.

As the fluorine grease 3, various ones are usable. Particularly, the fluorine greases described below are preferably used. However, the present invention is never limited by them.

Figure 2:
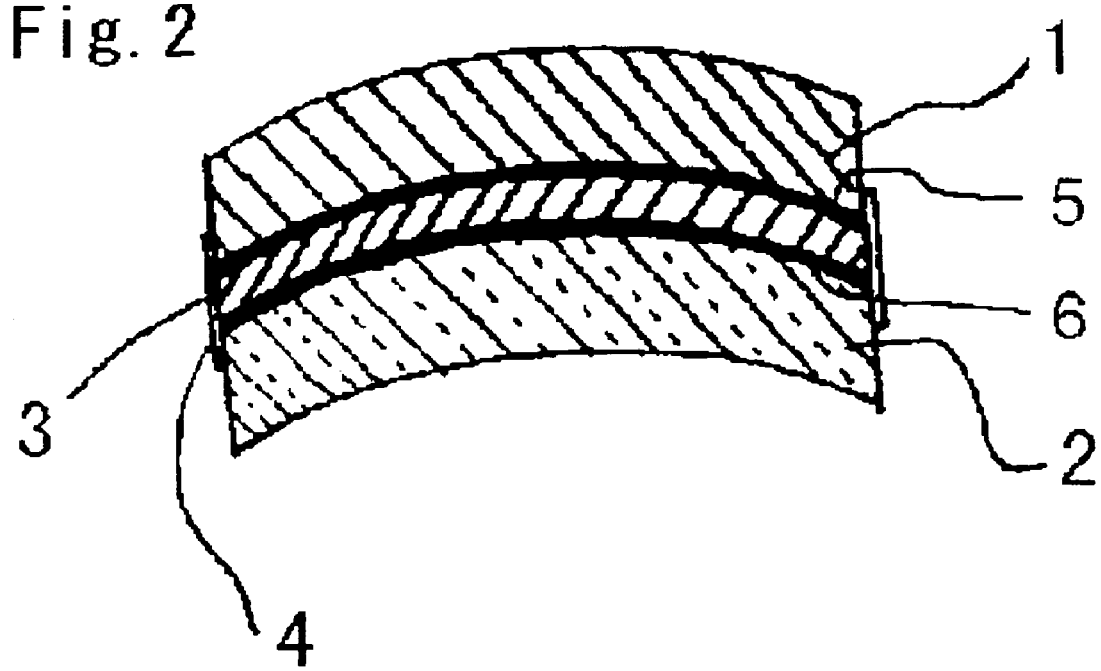
FIG. 2 is a schematic sectional view of an optical member according to the other embodiment of the present invention.

It was found that, when the lenses 1 and 2 stuck as shown in FIG. 2 are irradiated with a high luminance ultraviolet ray having a short wavelength of 200 nm or less, the surface of the lenses 1 and 2 in contact with the fluorine-based grease 3 as the fluorine oil are roughed. The roughing of the surface of the lenses 1 and 2 can be prevented by evaporating fluorides 5, 6 such as magnesium fluoride on the surface of the lenses 1 and 2.

EXAMPLE 1

Fluorine grease produced by Daikin Industries Ltd. (trade name: DEMNUM Series)

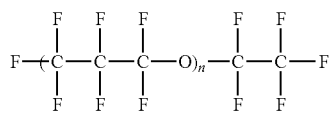

EXAMPLE 2

Fluorine grease produced by E.I. du Pont de Nemours & Company

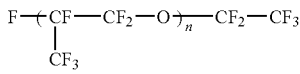

EXAMPLE 3

Fluorine grease produced by Solvay S.A. (trade name; FOMBLIN)

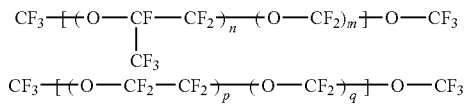

In the embodiment of FIG. 1, the fluorine grease produced by Daikin Industries, Ltd. is used.

In the state after the fluorine grease 3 is filled between the lenses 1 and 2, the total thickness of the fluorite ($CaF_2$) lens 1, the fluorine grease 3, and the synthetic quartz ($SiO_2$) lens 2 is about 5 mm although it is exaggerated in FIG. 1.

As shown in FIGS. 1 and 2, after the fluorine grease 3 is filled in the gap between the fluorite ($CaF_2$) lens 1 and the synthetic quartz ($SiO_2$) lens 2, the whole periphery of the lenses 1 and 2 is sealed with a sealant 4.

As the sealant 4, for example, organic solvent-soluble amorphous fluorine resins such as CYTOP (trade name, produced by Asahi Glass Co., Ltd.), TEFLON (registered trademark), AF Series (trade name, produced by Du Pont-Mitsui Fluorochemicals Company, Ltd.), ALGOFLON AD series (trade name, Solvay Solexis K.K.), INT-444V (trade name, produced by NI material), and other products produced by Hoechst AG and Mitsubishi Rayon Co., Ltd. can be used. In this case, the fluorite ($CaF_2$) lens 1 and the synthetic quartz ($SiO_2$) lens 2 can be more firmly bonded, and the leak of the fluorine grease 3 from the periphery of the gap between the lenses 1 and 2 can be surely prevented.

In addition to these fluorine-based oils, as the same fluorine-based organic compounds, AFLUDE (trade name, produced by Asahi Glass Co., Ltd.), other perfluorocarbons (PFC, produced by 3M Company and E.I. du Pont de Nemours & Company), hydrofluorocarbons (HFC), hydrofluoroether (HFE), DEMNUM (produced by Daikin Industries, Ltd.), FOMBLIN (produced by Solvay AG), KRYTOX (produced by E.I. du Pont de Nemours & Company) and others can be also used for the production of an optical member for use in ultraviolet region.

[Experiment]

An optical member was produced by sticking two lenses 1 and 2 as shown in FIG. 1. The optical member was irradiated with an excimer laser such as KrF laser of deep UV 248 nm from a general direction at an output of 3 W/cm² for 148 hours. The optical thickness of the fluorine grease 3 was 10 μm, but the transmittance of the fluorine grease 3 was hardly changed. Adhesion distortion was hardly observed.

[Comparative Experiment]

An optical member having the same shape and dimension as the optical member used in the above experiment (e.g., the same diameter, thickness and clearance between lenses 1 and 2) was produced by performing the adhesion of fluorite ($CaF_2$) lens and synthetic quartz ($SiO_2$) lens by use of an adhesive consisting of an organic silicone resin of SILPOT 184 produced by Dow Corning Corp. instead of filling the fluorine grease 3 in the gap between the lenses 1 and 2. The optical member for comparative experiment was irradiated with an excimer laser such as KrF laser of deep UV region 248 nm at an output of 3 W/cm² for 148 hours similarly to the above experiment. Consequently, the layer formed by the adhesive consisting of the organic silicone resin of SILPOT 184 produced by Dow Corning Corp. was peeled as it is burnt off by the laser beam of the excimer laser, and deteriorated. Adhesion distortion was also caused to deteriorate the characteristics of the optical member.

According to the present invention, a plurality of lenses can be further firmly and precisely joined, and the leak from the periphery of the gap between the lenses can be surely prevented. Further, the deterioration by UV absorption can be also avoided.

What is claimed is:

1. An optical member comprising:
a plurality of mutually stuck optical members comprising fluorite ($CaF_2$) and synthetic quartz ($SiO_2$) for use in an ultraviolet region having wavelengths of 100-200 nm;
a fluorine-based organic compound provided between the optical members wherein the fluorine-based organic compound is selected from the group consisting of:

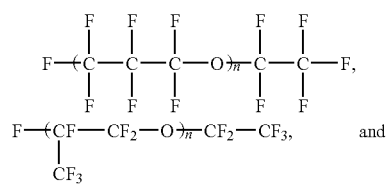

-continued

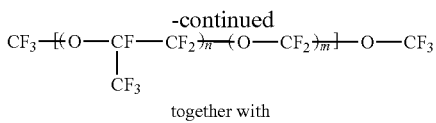

together with

where m means one or more, n means ten or more, p means one or more and q means one or more, and an adhesive fluorine resin for adhesively sealing a periphery of the fluorine-based organic compound at a periphery of the optical members, where the adhesive fluorine resin has an optical thickness of 10 μm, and a deterioration by UV absorption can be avoided when the optical member is irradiated with a KrF laser of a deep UV wavelength of 248 nm at an output of 3W/cm$^2$ for 148 hours.

2. The optical member according to claim 1, wherein the fluorine-based organic compound is a fluorine-based oil.

3. A semiconductor inspection device comprising the optical member of claim 1 so as to allow inspection of the semiconductor.

* * * * *